Feb. 1, 1949.　　　A. C. PABST ET AL　　　2,460,792
ORGANIC MEDIUM FOR THE PRODUCTION OF AEROSOLS

Filed Oct. 3, 1946　　　　　　　　　　3 Sheets-Sheet 1

INVENTOR.
ARTHUR C. PABST.
ALBERT E. GRIFFITHS
ROBERT B. KILLINGSWORTH
BY
AGENT OR ATTORNEY

Feb. 1, 1949.  A. C. PABST ET AL  2,460,792
ORGANIC MEDIUM FOR THE PRODUCTION OF AEROSOLS
Filed Oct. 3, 1946  3 Sheets-Sheet 2

ARTHUR C. PABST
ALBERT E. GRIFFITHS
ROBERT B. KILLINGSWORTH
INVENTOR.

BY *Francis F. Johnston*

AGENT OR ATTORNEY

Patented Feb. 1, 1949

2,460,792

UNITED STATES PATENT OFFICE 2,460,792

ORGANIC MEDIUM FOR THE PRODUCTION OF AEROSOLS

Arthur C. Pabst, Douglaston, Albert E. Griffiths, Port Washington, and Robert B. Killingsworth, Douglaston, N. Y., assignors to Socony-Vacuum Oil Company, Incorporated, a corporation of New York Application October 3, 1946, Serial No. 700,858

8 Claims. (Cl. 196—149)

The present invention relates to the generation of fogs and, more particularly, to the generation of insecticide and herbicide bearing fogs and carrier oils for insecticides.

It is recognized by those skilled in the arts that fogs useful for different purposes have different characteristics. Thus, a fog for purposes of concealment must exist for relatively long periods of time whereas a fog suitable for distributing insecticides or herbicides must exist sufficiently long to obtain maximum coverage but settle quickly enough to bring the toxicant into contact with the fauna or flora to be destroyed before the fog is blown away or dispersed. The adaptation of the airplane to insect control has emphasized the need for control of the characteristics of toxicant bearing fog. While there is still disagreement relative to the determination of the absolute diameter of fog particles or droplets, for practical purposes it has been determined that for use as carriers for insecticides or herbicides the particle size and the distribution of particle size must be controlled.

While methods of measurement of absolute particle size are still subject to change and perhaps to improvement, present methods provide a reliable method of measuring relative particle size. That is to say that, while present measurements may not determine the exact size of the fog particles as they actually exist in the fog and thus the actual particles size distribution in the fog, particle size measurements and particle size distribution as made by the present methods can be and have been correlated with actual field results.

One method of measuring particle size employs a microscope slide coated on one side with a film of zinc stearate. The slide is exposed horizontally within the test area. After exposure the number of droplets of 1 to 5 microns ($\mu$), 10 to 20 microns and larger than 20 microns is determined by examination under the microscope.

Recent investigations in connection with the extermination of mosquitoes and other insects over large areas have emphasized the necessity of controlling the particle size of insecticidal sprays and aerosol fogs. In general, it has been determined that sprays or fogs consisting of particles of an average mass-diameter greater than 10 to 20 microns are characterized by poor dispersion, insufficient coverage and excessive deposition in the area contiguous to the spraying equipment. Fogs comprising particles having a mass-median diameter less than 5 to 10 microns are characterized by slow settling and excessive drifting with results in lowering the concentration of the toxicant deposited per unit area.

As the study of particle size has progressed it has become increasingly apparent that each different set of conditions may require a different particle size for most efficient insect control. However, the development of spray machinery and insecticide carriers has not kept pace, in ability to produce particles of desired predetermined size and known uniformity, with accumulated entomological information.

Until recently most attempts to control the particle size and particle size distribution in mechanical mists and thermal aerosol fogs has been based upon changing the nozzle pressure, upon the position of "breaker" bars or upon the temperature of the vaporizing chamber when using thermal aerosol generators to produce the mist or aerosol fog. A little attention has been given to the effect of the viscosity of the oil upon particle size but other characteristics of the oils in the past have not been considered in relation to the possible effect of these other characteristics upon sprays or aerosol fogs.

In a field test two hydrocarbon mixtures were compared under substantially identical conditions using a "Todd" insecticide fog applicator. The "Todd" insecticide fog applicator is a thermal aerosol generator designed and operated to provide controlled temperatures from about 400 to about 1200 degrees Fahrenheit. Rough measurements of particle size were made by exposing slides coated with oleophobic materials in the path of the fog and immediately measuring the particle sizes under a microscope. Two observations were made, one of gross nature and the other of more refined character. First the mist or aerosol fog produced by the applicator when using a prior art type carrier (#2 fuel oil) was thin and of fleeting character. That is to say, about the lower half of a one-story building about 10 to 15 feet behind the fog was obscured for a relatively short period. On the other hand, a mist or aerosol fog produced by the same applicator under substantially the same conditions but employing a novel oil of the present invention as a fog medium completely obscured the entire building for a relatively long period of time. These gross observations were indicative that the mist or areosol fog produced from the oil of the present invention comprised a more desirable particle size and more uniform particle size distribution. This was confirmed by rough measurements of particle size of the droplets caught on the slides exposed in the path of the fog. The mass median diameter of the particles comprising the mist or aerosol fog produced from the #2 fuel oil, typical of prior art materials, by the "Todd" applicator was about 60 microns, whereas that of the mist or thermal aerosol produced by the same "Todd" applicator at substantially the same temperature from the novel medium was about 27 microns. Furthermore, the particles produced from the novel hydrocarbon mixture were more uniform in size than those produced from the #2 fuel oil.

A visual comparison of the gross differences between mechanical mists or aerosol fogs produced from #2 fuel oil, typical of prior art media, and those produced from the novel dispersing media is possible by a study of the drawings Figures 1A and 1B and 2A and 2B.

The photographs, reproductions of which appear as Figures 1A and 1B, were taken from the same spot. Both of the aerosol fogs were produced by the same "Todd" insecticide fog applicator operating at about 800 degrees Fahrenheit. Figure 1A was obtained when the aerosol fog was being produced from #2 fuel oil. Figure 1B was obtained when the aerosol fog was being produced from a novel fog medium. It will be noted that the building, the upper portion of which is unobscured in Figure 1A, is competely hidden in Figure 1B.

Figures 2A and 2B likewise illustrate the considerable difference between aerosol fogs produced from prior art materials (#2 fuel oil) and media described hereinafter. The fog produced by the airplane exhaust generator in Figure 2A is being produced from #2 fuel oil with the generator operating at about 800 degrees Fahrenheit. On the other hand, the aerosol fog produced by the same airplane exhaust generator in Figure 2B is being produced from a hydrocarbon mixture typical of the novel mixtures described hereinafter. To those skilled in the art the fog pictured in Figure 2A is thin and provides poor coverage whereas that seen in Figure 2B is thick and provides good coverage, i. e. increased area treated per unit of medium.

While the tests discussed hereinbefore and illustrated in Figures 1 and 2 established the correctness of the fundamental principles involved, it was recognized that field tests were too time-consuming and too subject to the vagaries of the weather to provide a means for establishing the limits of the variables involved. Accordingly, a laboratory testing method was evolved which provided a rapid means for evaluating various media. The value of each media thus determined to be effective could then be tested in the field. Thus, the problem of providing media from which mists or aerosol fogs having controlled characteristics can be produced, had been solved.

It is an object of the present invention to provide media for the production of mechanical mists or thermal aerosol fogs comprising mixtures of hydrocarbons providing fog particles having predetermined mass-median diameters. It is another object of the present invention to provide media for the production of mechanical mists or thermal aerosols comprising mixtures of hydrocarbons providing fogs having a major portion of the particles within a particular predetermined size range correlated with the use for which the fog is produced and the character of the terrain over which the fog is to be produced. These and other objects and advantages will become apparent to those skilled in the art from the following description taken in conjunction with the drawings.

It has been discovered that the ability of fog media to produce desirable particle size fogs is dependent upon the size of the "gap" between the final boiling point of the relatively low boiling constituent and the initial boiling point of the higher boiling component. The size of the "gap" between the 90 per cent distillation point, i. e. 90 per cent point, of the lower boiling component and the 10 per cent distillation point, i. e. 10 per cent point, of the higher boiling component may also be used in measuring "gap" effect upon particle size. (Those skilled in the art know that the 90 per cent point is the temperature at which 90 per cent of a material has vaporized and condensed and the 10 per cent point is the temperature at which 10 per cent of a material has vaporized and condensed.) However, the more pronounced the actual "break" between the boiling range of any two components, the more marked is the effect of the mixture upon particle size.

For reasons of economy the most widely used media for the production of mechanical mists and aerosal fogs are hydrocarbon oils, particularly mineral oils. Mixtures of petroleum fractions which include "gaps" of at least 100 degrees Fahrenheit between the 90 per cent point of the low boiling component and the 10 per cent point of the high boiling component or of at least 25° F. between the final boiling point of the low boiling component and the initial boiling point of the high boiling component are satisfactory media for producing mechanical mists or aerosol fogs having a mass-median diameter in the range 1 to 20 microns. Hydrocarbon mixtures having "gaps" of less than 100° F. between the 90 per cent and 10 per cent points or of less than 25 degrees between the final and initial boiling points of the two components act as single fractions. In otherwords, as the boiling ranges of the components are broader, i. e. the "gap" is lessened, and/or the viscosity of the mixture is increased the number of particles of less than 20 microns diameter becomes less and the size distribution becomes more non-uniform.

In addition to the effect of "gap" in producing an increased number of particles of less than 20 microns diameter and increased uniformity of size distribution, the volatility of the relative low boiling component and the percentage of low boiling material in the fraction have a modifying influence on the particle size and distribution. When the low boiling material has a 50 per cent distillation point (50 per cent point) below 275° F., the particles tend to become too small (less than 5 microns). Similar results obtain when the low boiling or highly volatile material represents more than 50 per cent of the mixture. A satisfactory medium from which to produce mechanical mists or thermal aerosol fogs has the following characteristics. The initial boiling point of the mixture should be not less than about 240 degrees Fahrenheit and the final boiling point not greater than about 750° F. Preferably, the initial boiling point should be about 360° F. and the final boiling point about 740° F. When based upon the 90 per cent and 10 per cent points the gap between the 90 per cent point of the lower boiling, i. e. more volatile, component and the 10 per cent point of the higher boiling, i. e. less volatile, component may be of the order of about 100 to about 325° F., preferably about 125° F. The final boiling point of the more volatile material and the initial boiling point of the less volatile material or component should not overlap, but may be separated or "gapped" by as little as 25° F. The more volatile material or component should have a 50 per cent point not less than about 275° F. and not greater than about 475° F. Preferably, the 50 per cent point of the more volatile component lies between about 400 and about 475° F. Media containing a more volatile component having a 50 per cent point appreciably below that given above produces fogs having a high percentage of "screening smoke" particles less than 1 to 2 microns in diameter. The percentage of more volatile component in the media should be from about 25 percent to about 65 per cent to obtain satisfactory results and about 50 per cent to obtain optimum results.

As has been pointed out, the most economical source of media for the production of mechanical mists and thermal aerosol fogs are hydrocarbons, particularly mineral oil hydrocarbons. Hydrocarbon mixtures characterized as described hereinbefore have an additional valuable characteristic. Those petroleum fractions which when combined to provide a properly "gapped" mixture are outstanding solvents for many insecticides and particularly for DDT (dichlorodiphenyltrichloroethane). Thus, the "gapped" oils permit the use of a greater concentration of toxicant and a lower rate of application per acre (gallons per acre). Furthermore, since the desired particle size and distribution can be obtained at lower temperatures than are necessary with "ungapped" mixtures, e. g. fuel oil, the decomposition of the toxicant is lessened or practically eliminated.

The principle of "gapped" oil mixtures has been successfully applied in the distribution of DDT from ground and air operated thermal fog generators. The fogs from such "gapped" mixtures are more lasting and cover a greater area than fogs from "ungapped" mixtures such as #2 fuel oil. Field tests have shown that a "gapped" mixture containing 3 per cent of DDT at a given rate of application will kill flies in practically twice the area as application of "ungapped" mixture (#2 fuel oil) containing 3 per cent DDT applied at the same rate. Corresponding efficiency is obtained at room temperature. In a Peet-Grady method test the toxicity of fly spray atomized at room temperature was increased by the use of a "gapped" mixture of hydracorbons in place of an "ungapped" mixture.

As has been noted hereinbefore, the evaluation of thermal aerosol mists produced by a "Todd"

generator or other means is fraught with many difficulties that preclude rapid study of the variables upon which the production of satisfactory fogs is dependent. It has been found, however, that laboratory results can be correlated with field tests and that the following test method serves the purpose of distinguishing satisfactory media from unsatisfactory media and satisfactory media from those that produce optimum results.

The laboratory test involves spraying the medium to be tested into a Peet-Grady chamber by means of a De Vilbiss special atomizer #5004 as specified by the National Association of Insecticide and Disinfectant Manufacturers for evaluation of insecticides. The medium is sprayed into the Peet-Grady chamber at a pressure of 30 pounds per square inch and at a temperature of 80° F. Glass slides coated with zinc stearate are placed in a horizontal position three feet from the nozzle of the atomizer and 12 inches below the projected horizontal axis of the nozzle. The slides are exposed to the mist for 10 seconds and examined immediately under a microscope. The mass-median diameter and the total number of particles per unit area are determined by means of an eyepiece micrometer.

A study of the effect of viscosity, boiling range and boiling level using "ungapped" petroleum fractions was made utilizing the afore-described test method.

TABLE I

| Material | Viscosity @ 100° F. | Distillation Range | F. B. P.–I. B. P. | Number of particles/mm.² Diameter in microns | | | |
|---|---|---|---|---|---|---|---|
| | | | | 1–5 | 10–20 | 75+ | largest particle |
| | *Centistokes* | *° F.* | *Degrees* | | | | *Microns* |
| A | 24.9 | 571–742 | 171 | 171 | 549 | 16 | 600 |
| B | 4.8 | 508–659 | 151 | 3,021 | 77 | 16 | 400 |
| C | 4.3 | 510–632 | 122 | 7,130 | 40 | 37 | 300 |
| D | 1.8 | 374–484 | 110 | 8,665 | 4 | 1 | 200 |
| E | 1.6 | 363–534 | 171 | 93,000 | 2 | 16 | 200 |

All materials are of petroleum origin; A is essentially a mixture of aromatic hydrocarbons obtained by catalytic cracking. B is a 40" viscosity paraffin base stock, commonly known to the trade as a mineral seal oil. C is essentially a mixture of aromatic hydrocarbons obtained by catalytic cracking. D is an odorless kerosene known to the trade as an insecticide base oil of paraffin origin. E is essentially an aromatic solvent containing in addition, some paraffinic and naphthenic constituents obtained by catalytic cracking.

A study of Table I leads to certain conclusions. None of the fogs produced from the hydrocarbon mixtures tested contained sufficient particles of the 10–20 micron diameter size to provide satisfactory results. Stated another way, the fogs so produced were unsatisfactory because many particles were of sizes other than the 10–20 micron size. It is apparent that there is a significant positive correlation between viscosity and particle size when "ungapped" petroleum fractions are compared. In other words, the particle size decreases and the number of small particles increases as the oil becomes less viscous. (Compare A and E having the same number of degrees between I. B. P. and F. B. P. but of widely different viscosities.) The minute particles probably are formed at the expense of the particles of intermediate (10–20$\mu$) size, for the total number of very large particles (75+) is not directly correlated with viscosity. This has been found to be true with "gapped" mixtures as well as with "ungapped" mixtures. However, the average diameter of the largest particle obtained from an oil of high viscosity is much greater than the maximum diameter of the largest particle from an oil of low viscosity.

The data in Table I indicate that particles become smaller and more numerous as the boiling range becomes narrower. However, this correlation is not clearcut because when a low boiling, highly volatile material such as "E" is studied, a tremendously increased number of small particles are obtained in spite of a relatively wide boiling range. It appears that the lower the initial boiling point (I. B. P.) of an oil, the smaller and more numerous are the particles produced. It appears from the foregoing data that the volatility of the lower boiling fractions begins to exert an influence on particle size when the initial boiling point falls below about 350 to about 375° F.

Field tests with the "Todd" generator had shown that a mixture of oils 50 volume per cent A and 50 volume per cent E (mixture #1), in other words a mixture of low and high boiling fractions with a gap between the final boiling point of the low boiling fraction and the initial boiling point of the high boiling fraction, showed that physical characteristics other than viscosity affect the particle size in aerosol fogs. When these hydrocarbon fractions were subjected to field test by injection into the exhaust stack of a plane flying at speed of 85 miles per hour at an altitude of 10 feet with stack temperature controlled at about 800° F., mixture No. 1 was found to provide a mist having the size distribution set forth in Table II as compared to the size distribution for the No. 2 fuel oil.

tested by the laboratory method described hereinbefore, a mist having the following particle size distribution was produced from mixture No. 1.

Number of particles per square millimeter

| 1-5µ diameter | 10-20µ diameter | 75+µ diameter | Total number of particles |
|---|---|---|---|
| 5775 | 7325 | 63 | 13,163 |

Thus, there is provided a correlation between the laboratory method of determining what is a suitable hydrocarbon mixture for the production of satisfactory mists and actual production of satisfactory aerosols. In other words, a medium from which a mist produced in the laboratory test having a ratio of the number of particles of 1-5 micron diameter to the number of particles of 10-20 micron diameter of from about 0.40 to about 1.6 and the number of particles of 1 to 20 microns is at least 95 per cent of the total number of particles of all sizes which will perform satisfactorily in field tests for distribution of insecticides. Satisfactory fogs are produced when the following factors are controlled: (1) the initial boiling point of the mixture; (2) the gap between the 90 per cent point of the more volatile component and the 10 per cent point of the less volatile or the gap between the F. B. P. of the former and the I. B. P. of the latter; (3) the 50 per cent point of the light material; and (4) the percentage by volume of light component (more volatile) in the mixture.

TABLE II

| Medium Mixture | Viscosity @ 100° F. | Distillation Range | "Gapped" | Diameter Largest Particle | Diameter Smallest Particle | Mass Median Diameter | Approximate per cent of particles in median group |
|---|---|---|---|---|---|---|---|
| | Centistokes | °F. | | Microns | Microns | Microns | |
| No. 1 | 5.0 | 380-760 | Yes | 150 | 8 | 65 | 75 |
| No. 2 Fuel Oil | 4.5 | 350-640 | No | 475 | 12 | 200 | 40 |

As with the "Todd" generator, the fog produced by the airplane exhaust stack from mixture No. 1 was more dense and lasting than that from No. 2 fuel oil. The fog from the fuel oil was observed to break up into distinct layers. When The data tabulated on Table III illustrates the effect of gap, initial boiling point and percentage of low boiling component upon the particle size and particle size distribution:

TABLE III

| Mixture No. | Volume per cent low boiling component (1) | Volume per cent high boiling component (2) | Viscosity @ 100° F. | Gap, °F. I. B. P. (2) less F. B. P. (1) | Gap, °F. 10% pt. of (2) less 90% pt. of (1) | Distillation range of mixture | Total Distillation range | Number of particles per square millimeter | | | |
|---|---|---|---|---|---|---|---|---|---|---|---|
| | | | | | | | | 1-5 micron diam. | 10-20 micron diam. | 75+ micron diam. | Total number of particles |
| | | | Centistokes | | | °F. | °F. | | | | |
| 1 | 50D | 50B | 2.0 | 24 | 111 | 374-659 | 285 | 4,704 | 2,195 | 29 | 6,928 |
| 2 | 50E | 50A | 5.0 | 37 | 121 | 363-742 | 379 | 5,775 | 7,325 | 63 | 13,163 |
| 3 | 50D | 50A | 3.6 | 87 | 183 | 374-742 | 368 | 5,443 | 5,469 | 56 | 10,968 |
| 4 | 50F | 50A | 2.4 | 176 | 251 | 316-742 | 426 | 7,380 | 4,941 | 35 | 12,356 |
| 5 | 50G | 50A | 2.0 | 253 | 325 | 242-742 | 500 | 8,016 | 5,369 | 43 | 13,428 |
| 6 | 50H | 50A | 2.0 | 305 | 372 | 122-742 | 620 | 19,800 | 50 | 60 | 19,910 |
| 7 | 75C | 25 CCl₄ | 2.2 | 340 | | 170-632 | 462 | 33,000 | 13 | 73 | 33,086 |
| 8 | 50C | 50 CCl₄ | 1.2 | 340 | | 170-632 | 462 | 49,500 | 40 | 53 | 49,593 |
| 9 | 75C | 25 H | 1.8 | 350 | | 160-632 | 472 | 19,800 | 50 | 66 | 19,916 |
| 10 | 75A | 25 CCl₄ | 5.3 | 401 | | 170-742 | 572 | 2,310 | 59 | 70 | 2,439 |
| 11 | 50A | 50 CCl₄ | 1.8 | 401 | | 170-742 | 572 | 1,485 | 26 | 59 | 1,570 |
| | 100A | | 24.9 | | | 571-742 | 171 | 171 | 549 | 16 | 736 |
| | 100B | | 4.8 | | | 508-659 | 151 | 3,021 | 77 | 16 | 3,114 |
| | 100C | | 4.3 | | | 510-632 | 122 | 7,130 | 40 | 37 | 7,207 |
| | 100D | | 1.8 | | | 374-484 | 110 | 8,665 | 4 | 1 | 8,670 |
| | 100E | | 1.6 | | | 363-534 | 171 | 93,000 | 2 | 16 | 93,018 |

All materials are of petroleum origin:
A is essentially a mixture of aromatic hydrocarbons obtained by catalytic cracking. B is a 40" viscosity paraffin base stock, commonly known to the trade as a mineral seal oil. C is essentially a mixture of aromatic hydrocarbons obtained by catalytic cracking. D is an odorless kerosine of paraffinic origin known to the trade as an insecticide base oil. E is essentially an aromatic solvent obtained by catalytic cracking and contains some paraffins and naphthenic. F is a highly refined, catalytically processed petroleum naphtha containing a relatively large percentage of aromatic hydrocarbons. G is a highly refined straight run petroleum naphtha containing a relatively low percentage of aromatic hydrocarbons. H is a highly volatile straight run solvent of relatively low aromatic content, also known to the trade as a petroleum ether.

A study of Table III makes it manifest that satisfactory mists can be produced from hydrocarbon mixtures which have an interval between the final boiling point of the lower boiling component and the initial boiling point of the higher boiling component of at least about 25° F. or, using another interval, the difference between the 90 per cent point of the lower boiling component and the 10 per cent point of the higher boiling point component is at least 100° F. Mixtures which have the foregoing "gaps" give satisfactory results even though the viscosities at 100° F. vary from 2 to 5 centistokes.

The results tabulated in Table III when studied in conjunction with the boiling ranges and the 50 per cent points of the components of the various mixtures as given in Table IV, clearly show that the 50 per cent point of the low boiling component should not be below about 275° F.

TABLE IV

| Component | I.B.P. | 50% | 90% | F.B.P. |
|---|---|---|---|---|
| | °F. | °F. | °F. | °F. |
| A | 570 | 670 | 725 | 740 |
| B | 505 | 580 | 620 | 660 |
| C | 510 | 550 | 590 | 630 |
| D | 370 | 400 | 435 | 485 |
| E | 360 | 440 | 500 | 530 |
| F | 315 | 340 | 370 | 395 |
| G | 240 | 275 | 295 | 320 |
| H | 122 | 166 | 247 | 266 |
| CCl₄ | 170 | 170 | 170 | 170 |

A further study of Table III shows that the number of particles falling in the 1–5 micron group and the total number of particles increase as the number of degrees in the F. B. P.–I. B. P. or 90%–10% interval increases. Inasmuch as the F. B. P. or the I. B. P. may vary considerably because of traces of high boiling or low boiling components whereas the 90 per cent and 10 per cent points are not affected so readily or to so great a degree, it is preferred to use the interval between the 90 per cent of the light or more volatile component and the 10 per cent point of the heavy or less volatile component when considering the effect of "gap" upon particle size.

There does not seem to be any direct correlation between the number of particles in the 10–20 micron group and any of the oil characteristics studied. However, there is evidence that as the number of 1–5 micron particles increases the number of 10–20 micron particles decreases. In the light of present entomological information which indicates that the desirable particle range is of the order of 10 to 20 microns, it is manifest that mixtures 1 to 5 (Table III) provide the desired particle size distribution. In other words, "gapped" mixtures in which the interval between the 90 per cent point and the 10 per cent point is about 100 to about 325 to about 350° F. when dispersed as a mist or aerosol fog provide the desired particle size. In this connection, it will be noted that the transition from an aerosol fog of desired particle size to one in which the particles preponderantly are of the 1–5 micron size, is very rapid. An increase in the interval between the 90 per cent and the 10 per cent points of about 20 degrees results in a mist of undesirable particle size. In other words, the size of the interval is critical. It will also be recognized that as the 90%–10% point interval is increased to the critical maximum, the mass-median diameter of the fog particles decreases and the total number of particles is increased. This is accompanied by a marked increase in the general uniformity of particle size.

It is manifest that as the 90%–10% interval becomes greater and approaches the critical maximum of 325 to 350° F. the number of very small particles increases very rapidly and the mass-median diameter falls below 1 to 2 microns into the screening smoke category. The tendency for particles to become markedly small is also pronounced when the more volatile component (low boiling component) is too highly volatile (mixtures 7 and 8). Consequently, the boiling range of the low boiling component is of importance. For satisfactory results, materials boiling below about 240 to 250° F. are objectionable. Mixture 2 containing low boiling component E at the present time is preferred.

Although it has been shown hereinbefore that as the "gap" increases the particle size decreases, the total number of particles increases and the total boiling range of the mixture increases, an "ungapped" mixture of wide boiling range is not a suitable medium for the production of insecticide or herbicide carrying mists or aerosol fogs. This is evident from an inspection of the data in Table V:

TABLE V

| "Ungapped" Mixture No. | Degrees Fahrenheit 90–10% pt. | Total Boiling Range, °F. | No. of particles per sq. millimeter | | | Total No. of particles |
|---|---|---|---|---|---|---|
| | | | 1–5μ | 10–20μ | 75+μ | |
| 12 | 10 | 240 | 8,163 | 300 | 20 | 8,483 |
| 13 | 103 | 348 | 7,830 | 333 | 54 | 8,217 |
| 14 | 103 | 374 | 4,998 | 500 | 126 | 5,624 |
| 15 | 125 | 444 | 2,499 | 184 | 72 | 2,755 |

TABLE VI

*Composition of mixtures*

| Mixture No. | 12 | 13 | 14 | 15 |
|---|---|---|---|---|
| Per cent B | 50 | 33.3 | 25 | 20 |
| Per cent D | | | 25 | 20 |
| Per cent L | 50 | 33.3 | 25 | 20 |
| Per cent J | | 33.3 | 25 | 20 |
| Per cent K | | | | 20 |
| I. B. P. °F | 519 | 409 | 390 | 342 |
| 10% | 565 | 460 | 420 | 374 |
| 20% | 577 | 479 | 437 | 394 |
| 30% | 590 | 500 | 455 | 413 |
| 40% | 602 | 529 | 474 | 432 |
| 50% | 615 | 567 | 503 | 463 |
| 60% | 627 | 602 | 555 | 506 |
| 70% | 643 | 625 | 605 | 574 |
| 80% | 660 | 647 | 638 | 625 |
| 90% | 682 | 672 | 674 | 666 |
| F. B. P. | 729 | 724 | 716 | 713 |

L is a furfural refined 60" viscosity mineral oil. J is a commercially available insecticide oil of essentially paraffinic nature, obtainable under the trade name Deo Base. K is a highly refined, straight run petroleum naphtha containing a relatively low percentage of aromatic hydrocarbons.

Each of mixtures 12, 13, 14, 15 was made up of the individual components in the amounts as tabulated in Table VI. As will be observed, the total boiling range of the mixtures increased from No. 12 to No. 15. While the total boiling range increased there were no "gaps," that is the F. B. P. of the lower boiling of two components of successive individual boiling range is as high as or higher than the I. B. P. of the next higher boiling component. The mixtures were tested for particle size and distribution in mists by the laboratory method as described hereinbefore. The particle size distributions obtained are tabulated in Table V.

For ease of comparison and to make certain observations easier, the particle size, etc. for 2 "ungapped" mixtures and 2 "gapped" mixtures are tabulated in Table VII.

TABLE VII

| Mixture No. | Degrees Fahrenheit 90-10% pt. | Total Boiling Range, °F. | °F. "Gap" | No. of particles per sq. millimeter | | | |
|---|---|---|---|---|---|---|---|
| | | | | 1-5μ | 10-20μ | 75+μ | Total No. of particles |
| "Gapped" No. 1 | | 285 | 111 | 4,704 | 2,195 | 29 | 6,928 |
| "Gapped" No. 5 | | 500 | 325 | 8,016 | 5,369 | 43 | 13,428 |
| "Ungapped" No. 12 | 10 | 240 | | 8,163 | 300 | 20 | 8,483 |
| "Ungapped" No. 15 | 125 | 444 | | 2,499 | 184 | 72 | 2,755 |

The first observation is that with increased interval between the 90 per cent and the 10 per cent points of "gapped" oils, the total boiling range increased from 285 degrees to 500 degrees. With this change in "gap" and total boiling range the number of 1–5μ and the number of 10–20μ particles practically doubled $$\left(\frac{8,016}{4,704}=1.7;\ \frac{5,369}{2,195}=2.4;\ \frac{13,428}{6,928}=1.9\right)$$

Figure 1A:
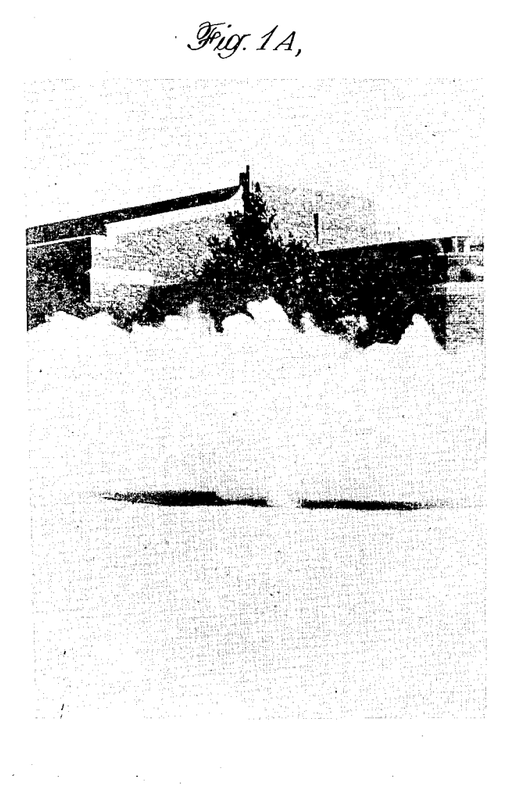
Figure 1B:
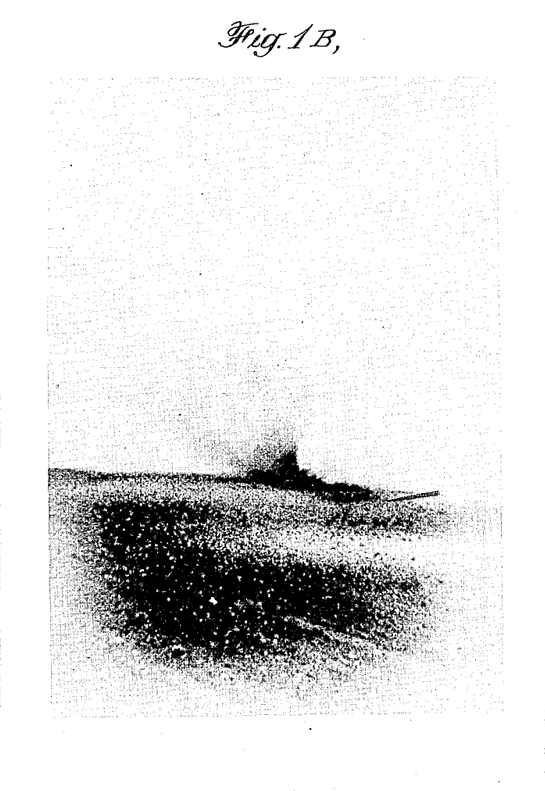
Figure 2A:
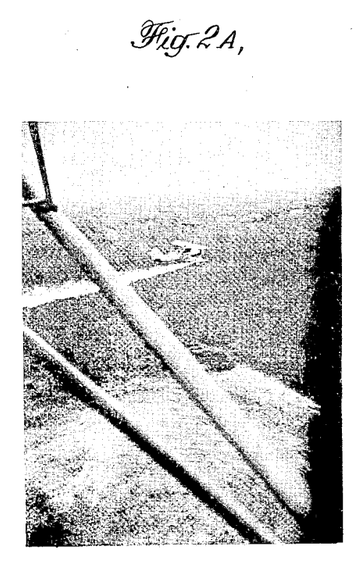
Figure 2B:
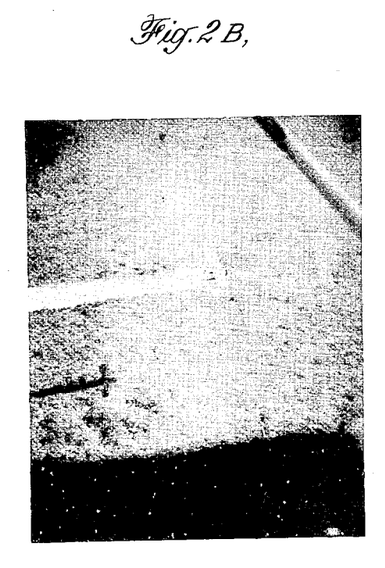
Figure 3:
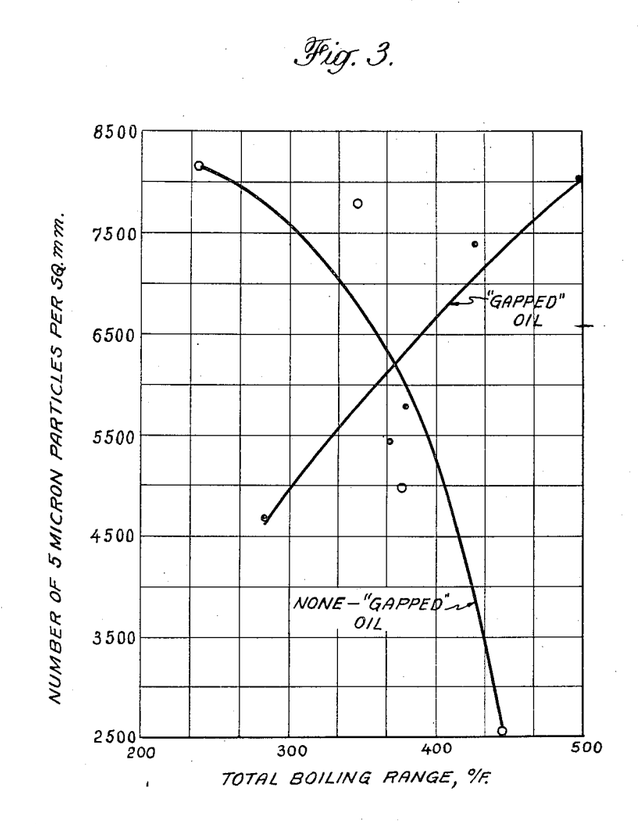

On the other hand, when the total boiling range of "ungapped" oils (#12 and #15) is increased from 240 to 444 degrees, the number of 1–5μ particles was reduced about 70 per cent, the number of 10–20μ particles is insignificant and the total number of small particles is only about ⅓ as great in the mist produced from the longest boiling mixture. This is illustrated in a graphic manner in Figure 3 which is a pair of curves showing the relation between total boiling range and number of 1 to 5 micron particles per square millimeter for "gapped" oils and "ungapped" oils. This comparison shows that "ungapped" oils behave in a manner similar to that of single petroleum fractions (Table I). It will be noted that the interval between the 90 per cent point and the 10 per cent point of the "ungapped" mixtures did not bring about a reduction in particle size although in one instance the "gap" for the mixture having overlapping F. B. P. and I. B. P. was within the range of critical "gap" for mixtures without overlapping F. B. P. and I. B. P. It will also be observed that there is a slight tendency for the particles falling within the 10–20 micron group to increase in number as the 90%–10% interval of the "ungapped" oils becomes wider. This manifestly indicates that there must be a sharp break between the boiling range of the light (low boiling, more volatile) component and the heavy (high boiling, less volatile) component.

The results of laboratory tests and field tests in producing mists or aerosol fogs of desirable particle size and distribution were confirmed in actual field test. Mixture 2 (Table III) when dispersed using an airplane exhaust stack fog generator will effectively cover twice the area as the same amount of an ungapped mixture of hydrocarbons. Two toxicant charged media were prepared each containing 3 per cent of DDT (dichlorodiphenyl trichloroethane). Each medium was sprayed from an airplane exhaust stack. Cages of houseflies were placed on the course of the plane at various distances from the median line thereof. The effective swath using the prior art medium containing 3 per cent DDT was 100 feet. The effective swath using mixture No. 2 was 200 feet. Thus, with a medium comprising a "gapped" mixture of components half as many flights are required as with prior art "ungapped" mixtures. Stated another way, the cost of area insect control is reduced markedly.

The control of insects in restricted areas such as barns, etc. likewise is improved by use of the novel media. The mists produced at room temperature by mechanical means from the novel media are more effective than prior art media as the following comparison shows.

TABLE VIII

| Median | Toxicant | "Gap" | Number of 10–20 particles per sq. mm. | Percent kill of houseflies |
|---|---|---|---|---|
| B | X | None | 470 | 74.4 |
| 25% D 75% B | X | 111 | 1,100 | 83.9 |

It will be observed that with the increase of particles of the 10–20 micron size the kill increased. Thus, the novel media may be used in household and animal sprays as well as for producing aerosol fogs for area control of insects and weeds.

The novel media will result in improved distribution of insecticides in orchards, vineyards, cranberry bogs and truck gardens, especially when used for the production of thermal aerosol fogs. Such fogs are more tenacious and lasting than mechanical mists or dusts and are more uniformly applied in small areas difficult of access by airplane or ground equipment. Although the direct application to plants of aromatic oils is not generally advised because of the possibility of plant injury, it is the opinion of competent scientific personnel that the minute quantities involved when the novel media are used as a fog application causes no damage. For example tests have shown that an acre of tree covered land can be effectively and uniformly covered by the toxicant bearing fog from one-half gallon of the novel media. Inasmuch as at least 1½ pounds of DDT may be dissolved in one-half gallon of the novel media, a sufficient amount of this insecticide or other toxicant may be distributed for the effective control of most crop pests without using excessive quantities of the novel media. In fact all recommendations for rates of application of DDT for control of codling moth, leaf hopper, aphid etc., do not exceed ½ to 1 lb. per acre. Thus as the efficiency of fog generators is increased it will be possible to reduce the rate of application of the novel media to less than one-half gallon per acre and still maintain a uniform lethal application of toxicant.

We claim:

1. An organic medium for the production of thermal aerosols having a boiling range of about 242° to about 742° F., said medium consisting of about 25 per cent to about 65 per cent of a more volatile hydrocarbon fraction and the balance a less volatile hydrocarbon fraction; said more volatile fraction having an initial boiling point of about 240° to about 370° F., a final boiling point of about 320° to about 530° F., a 50 per cent point of about 275° to about 440° F., and a 90 per cent point of about 295° to about 500° F.; said less volatile fraction having an initial boiling point of about 505° to about 570° F., a 10 per cent point of about 546° to about 621° F., and a final boiling point of about 630° to about 740° F.; and the 90 per cent point of the more volatile fraction being separated from the 10 per cent point of the less volatile fraction by about 111° to about 325° F.

2. An organic medium for the production of aerosols having an initial boiling point not less than about 240° F. and a final boiling point not greater than about 750° F. and consisting of about 25 per cent to about 65 per cent of a more volatile hydrocarbon fraction and the balance a less volatile hydrocarbon fraction; the final boiling point of said more volatile fraction being separated from the initial boiling point of said less volatile fraction; the 50 per cent point of the more volatile fraction being not lower than about 275° F. and not higher than about 475° F.; and the 90 per cent point of the more volatile fraction being separated from the 10 per cent point of the less volatile fraction by about 100° to about 325° F.

3. An organic medium for the production of aerosols having an initial boiling point of about 240° F. and a final boiling point of about 750° F. and consisting of about 40 per cent to about 50 per cent of a more volatile hydrocarbon fraction and the balance a less volatile hydrocarbon fraction; said more volatile fraction having an initial boiling point of about 240° F. to about 370° F., a final boiling point of about 320° to about 530° F., a 50 per cent point of about 275° to about 440° F., and a 90 per cent point of about 275° to about 500° F.; said less volatile fraction having an initial boiling point of about 505° to about 570° F., a 10 per cent point of about 546° to about 621° F., and a final boiling point of about 630° to about 740° F.; and the 90 per cent point of the more volatile fraction being separated from the 10 per cent point of the less volatile fraction by about 111° to about 325° F.

4. An organic medium for the distribution of insecticides, fungicides and herbicides comprising about 25 per cent to about 65 per cent of a more volatile hydrocarbon fraction and the balance a less volatile hydrocarbon fraction; the final boiling point of said more volatile fraction being separated from the initial boiling point of the less volatile fraction; the 90 per cent point of the more volatile fraction being separated from the 10 per cent point of the less volatile fraction by about 100° to about 350° F.; the more volatile fraction having a 50 per cent point of about 275° to about 475° F.; said medium having an initial boiling point of about 240° F. and a final boiling point of about 750° F.; said organic medium being dispersible as an aerosol having a mass median diameter of about 65 microns and having at least about 75 per cent of the total number of particles in the median group.

5. In the treatment of areas infested with noxious weeds, fungi and insects which comprises applying to said areas, in the form of a mist, spray or fog, one of the group herbicides, fungicides and insecticides and a carrier or diluent, the improvement which comprises employing as a carrier or diluent an organic medium for the production of aerosols having a boiling range of about 242° to about 742° F., said medium consisting of about 25 per cent to about 65 per cent of a more volatile hydrocarbon fraction and the balance a less volatile hydrocarbon fraction; said more volatile fraction having an initial boiling point of about 240° to about 370° F., a final boiling point of about 320° to about 530° F., a 50 per cent point of about 275° to about 440° F., and a 90 per cent point of about 295° to about 500° F.; said less volatile fraction having an initial boiling point of about 505° to about 570° F., a 10 per cent point of about 546° to about 621° F., and a final boiling point of about 630° to about 740° F.; and the 90 per cent point of the more volatile fraction being separated from the 10 per cent point of the less volatile fraction by about 111° to about 325° F.

6. In the treatment of areas infested with noxious weeds, fungi and insects which comprises applying to said areas, in the form of a mist, spray or fog, one of the group herbicides, fungicides and insecticides and a carrier or diluent, the improvement which comprises employing as a carrier or diluent an organic medium for the production of aerosols having an initial boiling point not less than about 240° F. and a final boiling point not greater than about 750° F. and consisting of about 25 per cent to about 65 per cent of a more volatile hydrocarbon fraction and the balance a less volatile hydrocarbon fraction; the final boiling point of said more volatile fraction being separated from the initial boiling point of said less volatile fraction; the 50 per cent point of the more volatile fraction being not lower than about 275° F. and not higher than about 475° F.; and the 90 per cent point of the more volatile fraction being separated from the 10 per cent point of the less volatile fraction by about 100° to about 325° F.

7. In the treatment of areas infested with noxious weeds, fungi and insects which comprises applying to said areas, in the form of a mist, spray or fog, one of the group herbicides, fungicides and insecticides and a carrier or diluent, the improvement which comprises employing as a carrier or diluent an organic medium for the production of aerosols having an initial boiling point of about 240° F. and a final boiling point of about 750° F. and consisting of about 40 per cent to about 50 per cent of a more volatile hydrocarbon fraction and the balance a less volatile hydrocarbon fraction; said more volatile fraction having an initial boiling point of about 240° F. to about 370° F., a final boiling point of about 320° to about 530° F., a 50 per cent point of about 275° to about 440° F., and a 90 per cent point of about 295° to about 500° F.; said less volatile fraction having an initial boiling point of about 505° to about 570° F., a 10 per cent point of about 546° to about 621° F., and a final boiling point of about 630° to about 740° F.; and the 90 per cent point of the more volatile fraction being separated from the 10 per cent point of the less volatile fraction by about 111° to about 325° F.

8. A process for the treatment of areas infested with noxious weeds, fungi and insects which comprises applying to said areas, in the form of a mist, spray or fog, an organic medium suitable for the distribution of insecticides, fungicides and herbicides comprising about 25 per cent to about 65 per cent of a more volatile hydrocarbon fraction and the balance a less volatile hydrocarbon fraction; the final boiling point of said more volatile fraction being separated from the initial boiling point of the less volatile fraction; the 90 per cent point of the more volatile fraction being separated from the 10 per cent point of the less volatile fraction by about 100° to about 350° F.; the more volatile fraction having a 50 per cent point of about 275° to about 475° F.; said medium having an initial boiling point of about 240° F. and a final boiling point of about 750° F.; said organic medium being dispersible as an aerosol having a mass median diameter of about 65 microns and having at least about 75 per cent of the total number of particles in the median group.

ARTHUR C. PABST.
ALBERT E. GRIFFITHS.
ROBERT B. KILLINGSWORTH.

REFERENCES CITED

The following references are of record in the file of this patent:

UNITED STATES PATENTS

| Number | Name | Date |
|---|---|---|
| 2,002,902 | Martin, Jr., et al. | May 28, 1935 |
| 2,056,121 | Carter | Sept. 29, 1936 |
| 2,105,856 | Coleman | Jan. 18, 1938 |
| 2,166,500 | Lyman | July 18, 1939 |
| 2,221,772 | App | Nov. 19, 1940 |
| 2,321,023 | Goodhue et al. | June 8, 1943 |
| 2,410,613 | Ruthruff | Nov. 5, 1946 |

Certificate of Correction

Patent No. 2,460,792. February 1, 1949.

ARTHUR C. PABST ET AL.

It is hereby certified that error appears in the printed specification of the above numbered patent requiring correction as follows:

Column 13, line 42, for "about 275°" read *about 295°*;

and that the said Letters Patent should be read with this correction therein that the same may conform to the record of the case in the Patent Office.

Signed and sealed this 13th day of September, A. D. 1949.

[SEAL]

JOE E. DANIELS,
*Assistant Commissioner of Patents.*